Patented Nov. 26, 1935

2,022,185

UNITED STATES PATENT OFFICE 2,022,185

FUNGICIDE

Herman Alexander Bruson, Germantown, Pa., assignor to The Resinous Products & Chemical Co. Inc., Philadelphia, Pa.

No Drawing. Application September 17, 1931, Serial No. 563,362

10 Claims. (Cl. 167—65)

This invention relates to fungicides which are valuable against resistant organisms especially of the ring worm type.

These new fungicides are prepared from nuclear alkylated salicylic acids in which the alkyl group is branched at the carbon atom which is attached to the benzene ring. These acids may be represented by the general formula:

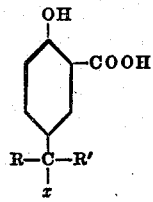

where R and R' are alkyl groups and "x" is a hydrogen atom or an alkyl group.

More specifically, the types of compounds belonging to the above class which have proved unusually effective in killing for example, the ring worm organism, trichophyton interdigitale, when applied in solution, in ointments, or in dusting powders either as the free acids themselves, or as their esters or water-soluble salts, are the following:

Para-isopropylsalicylic acid,

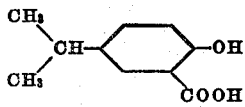

Para-secondary-butyl salicylic acid,

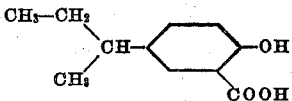

Para-tertiary-butylsalicylic acid,

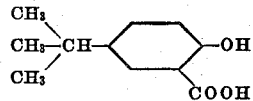

Para-secondary-amylsalicylic acid,

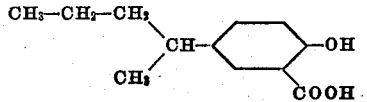

Para-tertiary-amylsalicylic acid,

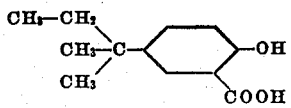

Para-methylisobutylsalicylic acid,

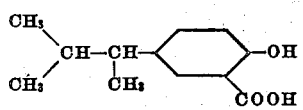

Para-ethylpropylsalicylic acid,

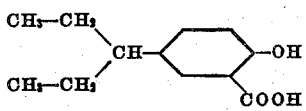

Para-sec-hexysalicylic acid,

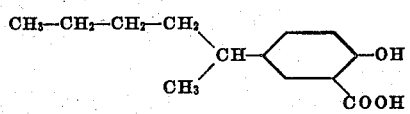

Para-sec-octylsalicylic acid,

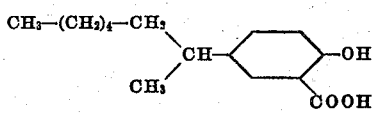

Para-cyclohexylsalicylic acid,

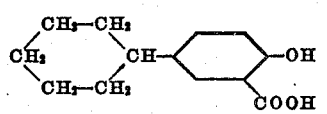

Para-sec-heptylsalicylic acid,

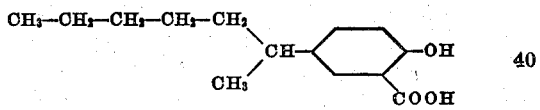

These compounds are soluble in vegetable and animal oils, and in lipoid tissue, and can be applied either in oils, or dissolved in petrolatum and used as ointments. A 5% solution of any one of the above compounds, para-isopropyl salicylic acid for example, in refined petrolatum and paraffin, kills the ring worm organism in a very short time. The above compounds are very slightly soluble in water, but are very soluble in alcohol and other organic solvents, as well as in glycerol and glycerol-water mixtures for application directly to the affected parts. They are much more effective than salicylic acid which is at present one of the best remedies for "Athlete's Foot". This may be due to the fact that they are not only more toxic to the organism but are also very soluble in lipoid tissue in contrast to salicylic acid, and are not washed away by perspiration.

The above alkylated salicylic acids are soluble in alkalies to give the corresponding salts. Their monosodium- and monopotassium salts are also very effective against ring-worm. Their esters such as the methyl-, ethyl-, propyl-, etc., are also very effective as fungicides.

Mixtures of any of the above compounds may be employed as lotions, dusting powders, or ointments, against the resistant fungi and moulds.

What I claim is:

1. As a fungicide, a substance having the general formula

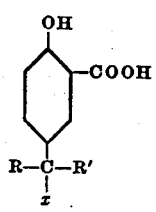

where R and R' are alkyl groups and "$x$" is a hydrogen atom or alkyl group.

2. As a fungicide, para-isopropylsalicylic acid.

3. As a fungicide, para-secondary butylsalicylic acid.

4. As a fungicide, a substance having the general formula

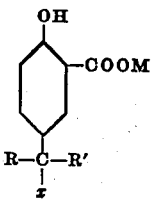

wherein R and R' are alkyl groups, "$x$" is a hydrogen atom or an alkyl group and M is a hydrogen atom, an alkali metal atom, or an alkyl group.

5. As fungicide, a substance having the general formula

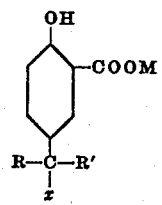

wherein R and R' are alkyl groups, "$x$" is a hydrogen atom or an alkyl group and M is an alkyl group.

6. As a fungicide, a substance having the general formula

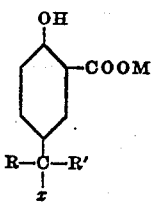

wherein R and R' are alkyl groups, "$x$" is a hydrogen atom or an alkyl group and M is an alkali metal.

7. As a fungicide, para-tertiary-butylsalicylic acid.

8. As an agent for destroying the ring worm organism, a compound comprising a salicylic acid in which the position para to the hydroxyl group is substituted by a secondary alkyl group.

9. As an agent for destroying the ring worm organism, a compound comprising a salicylic acid in which the position para to the hydroxyl group is substituted by a tertiary alkyl group.

10. As an agent for destroying the ring worm organism, a compound comprising a member of the group consisting of a salicylic acid in which the position para to the hydroxyl group is substituted by a hydrocarbon radical containing from three to eight carbon atoms inclusive, said hydrocarbon radical being branched at its point of attachment to the benzene ring, and the alkali metal salts and alkyl esters of said acids.

HERMAN ALEXANDER BRUSON.